United States Patent [19]

Yaacov et al.

[11] Patent Number: 4,605,708

[45] Date of Patent: Aug. 12, 1986

[54] METHOD FOR PREPARING FLAME RETARDANT THERMOPLASTIC NYLON RESINS AND COMPOSITIONS THEREFOR

[75] Inventors: Yoav-Bar Yaacov; Ram Minke, both of Beer-Sheva, Israel

[73] Assignee: Makteshim Chemical Works Ltd., Israel

[21] Appl. No.: 775,104

[22] Filed: Sep. 11, 1985

Related U.S. Application Data

[63] Continuation of Ser. No. 489,561, Apr. 28, 1983, abandoned.

[30] Foreign Application Priority Data

May 10, 1982 [IL] Israel .................................. 65726

[51] Int. Cl.$^4$ .................. C08F 283/04; C08L 63/00
[52] U.S. Cl. ........................... 525/423; 523/460; 524/409; 525/533; 525/930
[58] Field of Search ................. 525/423, 533, 930; 523/460; 524/409

[56] References Cited

U.S. PATENT DOCUMENTS 3,920,602  11/1975  Freed ................................... 525/423
4,340,697   7/1982  Aya ..................................... 525/423

OTHER PUBLICATIONS

Lee & Neville, *Handbook of Epoxy Resins*, N.Y. 1967, pp. 2-11 and 4-12.

*Primary Examiner*—Melvyn I. Marquis
*Assistant Examiner*—A. L. Carrillo
*Attorney, Agent, or Firm*—Ostrolenk, Faber, Gerb & Soffen

[57] ABSTRACT

A method for preparing flame retardant thermoplastic nylon compositions comprising incorporating into the thermoplastic nylon a halogenated bisphenol-A epoxy resin having a halogen content of at least 20% and a molecular weight above 8,000 in an amount sufficient to impart flame retardance.

10 Claims, No Drawings

METHOD FOR PREPARING FLAME RETARDANT THERMOPLASTIC NYLON RESINS AND COMPOSITIONS THEREFOR

This is a continuation of application Ser. No. 489,561 filed Apr. 28, 1983, now abandoned. P This invention relates to flame retardant thermoplastic polyamide resin compositions and to a method for preparing flame retardant thermoplastic polyamide resins.

Thermoplastic polyamide resins belong to the group of polymers known as engineering plastics. Included among these are thermoplastic polyesters such as tetramethylene terephthatate, polycarbonates, polysulfones, polyacetals etc. These polymers are characterized by relatively high softening temperatures and therefore can be readily shaped into useful articles which under normal and even elevated temperatures maintain exceptionally good physical properties.

Thermoplastic polyamides popularly known as nylon resins, have excellent physical properties for certain types of applications and because of the nitrogen in the polymer chain, they impart a slight flame retardance. However, this is insufficient for most modern requirements. For this reason, numerous additives have been proposed to improve the flame resistance of nylons.

Tetrabromobisphenol glycidyl ethers have been proposed as flame retarding additives for thermoplastic and thermosetting resins. Thus, for instance, U.S. Pat. No. 3,965,212 discloses the use of tetrabromobisphenol glycidyl ethers having up to 11 tetrabromobisphenolic groups in the polymer chain (i.e. maximum mol. wt. about 6,700) as flame retarding additive to thermoplastic polytetramethylene terephthalate.

Similarly German Offenlegenschrift No. 2,757,557 discloses tetrabromobisphenol glycidyl ether polymers as flame retardant additives for thermoplastic polyesters and polycarbonates. These brominated epoxy additives are claimed to have up to 21 repeating tetrabromobisphenolic groups in the chain (i.e. maximum molecular weight of about 12,700).

U.S. Pat. No. 4,105,622 also discloses the utility of the brominated bisphenol epoxy polymers as flame retardant additives for modified thermoplastic polyesters. Here also the brominated polymers are stated to have up to 16 tetrabormobisphenol groups in the chain, or a maximum mol.wt. of about 9,700.

Japanese patent Publication No. 75/27843 claims fireproofing agents comprising ernarnmnaimhenn-A dyidy eher reainn mrndu enr a variey ne hermnmai and hermneind rein he arnminaed emnuide are aed n have um n (A 9 ( eraarnmnaimhenni remeaind drnum enr a mauimum mn v ne aanu (A 5,500.

These above cited patents however exemplify only brominated epoxy resins have molecular weights less than 5,000 or so.

When attempting to use such brominated epoxy resins as flame retardant additives for thermoplastic polyamides used in injection molding there was encountered severe difficulty in processing. Thus, for example, when tetrabromobisphenol-A epoxy resin having a molecular weight of about 4,000, similar to the ones used in the above described prior patent publications, was blended with nylon 6/6 polymer, the resulting blend upon injection molding had an increased melt viscosity sufficient to make molding practically impossible. The flow of the heated polymer mass was too slow and the mold could not be completely filled with polymer. With nylon 6, the melt viscosity increased 500%.

It is possible to overcome this flow problem somewhat by raising the processing temperature and injection pressure, however, this produces a darkened resin which is probably caused by degradation at the high temperature. Furthermore, at the higher temperature, some of the brominated epoxy resin additive may degrade and liberate bromine which can be very corrosive to the equipment.

We have found that halobisphenol-A epoxy resins having a molecular weight above 8,000 and preferably above 12,000 overcome the processing difficulty and in fact improve processability when used with thermoplastic polyamides, and impart the desired flame retardance while maintaining good color.

Our invention thus comprises a method of preparing a flame retardant thermoplastic nylon composition by incorporating into the nylon 3 to 40 and preferably 5 to 25 parts by weight of H.M.Wt, halobisphenol-A epoxy resin having a molecular weight above 8,000.

Compositions of thermoplastic nylon having incorporated therein 3 to 40 and preferably 5 to 25 parts by weight of halobisphenol-A epoxy resins of molecular weight greater than 8,000 are also contemplated within this invention.

High molecular weight halogenated epoxides can be prepared by the methods disclosed in U.S. Pat. No. 4,104,257 and the prior art cited therein. In general it involves reacting a halogenated bisphenol glycidyl ether with bisphenol or halogenated bisphenol in the presence of a suitable catalyst and optionally in a suitable solvent.

Suitable catalysts which can be employed for preparing high mol.wt.epoxy resins are disclosed in U.S. Pat. Nos. 3,306,872; 3,379,684; 3,477,990; 3,547,881; 3,637,590; and 3,948,855.

Particularly preferred catalysts are quaternary phosphonium compounds having a halide or carboxyl group as anion portion, such as for example ethyl triphenyl phosphonium acetate, tetrabutyl phosphonium chloride, tetrabutyl phosphonium bromide and tetrabutyl phosphonium acetate.

Suitable solvents or inert reaction media which may be employed in preparing the high mol. wt. brominated epoxides includes the lower alkyl ethers of ethylene or propylene glycol or mixture of these.

Any solvent, however, or reaction medium is really suitable as long as it maintains the reactants and products in solution or intimate suspension at the reaction temperature employed and which will not react with the reactants or products or the catalyst and which can be readily separated if desired from the reaction product.

The thermoplastic nylon polymer of this invention can be any of the commonly known engineering nylons such as for example nylons 6, 6/6, 6/10, 6/12, nylons 10, 11, and 12. Any one of the polyamides which when blended with low mol.wt. tetrabromobisphenol-A glycidyl ether shows processing difficulties because of increased melt index and flowability, can be used in the invention.

The composition of this invention can of course have in addition to the nylon and H.M.wt. halogenated bisphenol epoxy resin, other additives which modify the final properties of the polymer. Such additives could be other known halogenated or phosphorus containing flame retardants, particularly synergistic flame retardants, especially antimony derivatives such as $Sb_2O_3$. Glass reinforcing fibers may also be incorporated into the composition to provide better heat distortion properties. Similarly, fillers can be used as is quite well known today in the art concerning these engineering plastics. Light and heat stabilizers, dyes, pigment and the like can also be added. The amount of H.M.wt. halogenated bisphenol-A glycidyl ether resin to be incorporated in the thermoplastic nylon polymer is in the order of 3 to 40 parts preferably 5 to 25 parts per 100 parts of nylon.

It is also preferred that antimony trioxide be incorporated as well to give maximum flame retardance to the composition. The amount of $Sb_2O_3$ used is such that the weight ratio of flame retardant to $Sb_2O_3$ is in the range of 0.25 to 6 and preferably 0.5 to 4.

The composition of this invention can be prepared by blending the thermoplastic nylon with the H.M.wt. halogenated bisphenol-A epoxy resin. This can be done in a number of ways, the essential thing being that the admixture should be homogeneous. This can be achieved by employing the nylon in the form of beads or pellets, mixing it intimately with the flame retardant epoxy resin and melting the resulting mixture for additional blending under pressure e.g. in an extruder. The composition of this invention can also be prepared by first preparing a master batch, dry blending the master batch pellets with additional Nylon, and then injection molding. It is preferable, however, to process the melt into pellets by extruding. The high shearing forces of the extruder causes a very thorough mixing of the molten mixture, and the resulting extrudate is cut to a suitable particle size and dried for injection molding.

We believe that the reason for the difficulty in using the prior art brominated epoxy resins with thermoplastic nylons is the fact that these epoxy resins have sufficient active epoxy groups which react upon heating with the amide groups of the nylon causing cross linking of the polymer. The high molecular weight halogenated epoxy resins have significantly fewer free epoxy terminal groups so that cross linking either does not occur or is insignificant.

The high molecular weight halobisphenol-A epoxy resins of this invention can be represented by the formula:

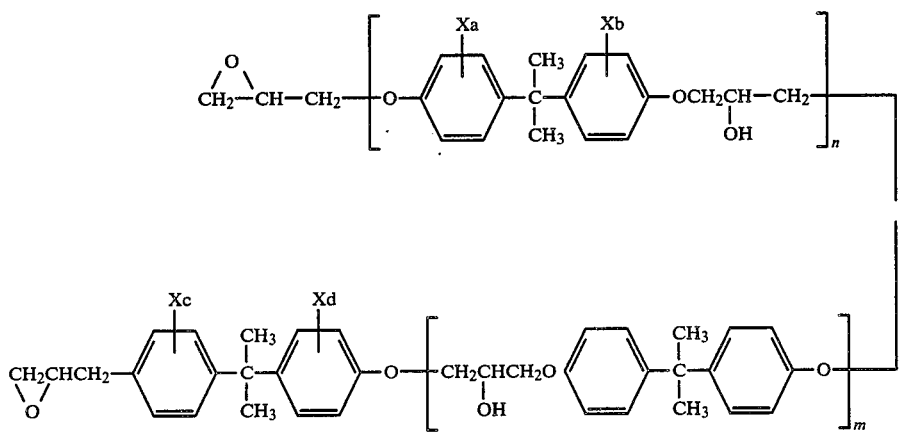

wherein X is a bromine or chlorine atom; a, b, c and d are individually integers of from 1 to 4 and n is a number greater than 5, m is a number from 0 to 25 or more and n+m is at least 12 but may be up to 50 or more, provided that the halogen content of the resin is at least 20% preferably at least 25%, and the molecular weight of the resin is above 8,000, preferably above 12,000.

Particularly useful are brominated epoxy resins wherein X is bromine, a, b, c and d are 2, n is at least 12 preferably 20–30, and m is 0.

EXAMPLE 1

A high molecular weight epoxy resin was prepared by reacting 540 g tetrabromobisphenol-A glycidyl ether having an epoxy equivalent 523 with tetrabromobisphenol-A 270 g, in 200 g diethylene glycol dimethyl ether solvent in the presence of 1 g tetrabutyl phosphonium bromide catalyst. The mixture was refluxed at 185° C. under a nitrogen atmosphere for 3 hours. The reaction mixture became very viscous. It was then poured into a large container of water while stirring vigorously. Thin fibers formed in the water which were the H.M. wt. epoxy resin. These fibers were separated from the water and soaked in methanol for 24 hours, then dried in an oven under vacuum. The dried product was a white amorphous product having an acid value of zero and intrinsic viscosity at 30° C. in dioxane of 0.11 dl/g, corresponding to a molecular weight of about 15,000 which is equivalent to n equals about 24 in formula 1.

EXAMPLE 2

540 g Tetrabromobisphenol-A bis glycidyl ether having an epoxy equivalent of 523 was mixed with 270 g tetrabromobisphenol-A and catalyst as in Example 1 and blended together at 150° C. The melt was transferred to a reaction tray and placed in an oven at 180° C. for 3 hours at which time non-aqueous titration of a sample gave an acid value of less than 2. The product, a glassy solid, was removed from the oven and chopped into small particles of about 0.5 cm$^3$. The intrinsic viscosity of this product was 0.153 dl/g at 30° C. measured in dioxane which corresponds to a molecular weight of about 20,000.

EXAMPLES 3 AND 4

Nylon 66 beads were dried in a vacuum oven at 120° C. for 3 hours and compounded with high molecular weight tetrabromobisphenol-A epoxy resin of example 2 in an extruder. The resulting pellets were injection molded into 3.2 mm thick specimen for physical testing. The specimens were conditioned at 50% relative humidity for 48 hours prior to testing. The results of these tests are shown in the following table. All parts are by weight.

| Material | Control (a) | Example 3 | Example 4 |
|---|---|---|---|
| Nylon 66 | 100 | 85 | 85 |
| Compound of Example 2 | — | 15 | 12 |
| Antimony trioxide | — | — | 4 |
| Tensile Strength (1) at 0.5% offset (Kg/cm$^2$) | 590 | 670 | 690 |
| Tensile (1) Modulus (Kg/cm$^2$) | 1060 | 1100 | 1150 |
| Elongation (1) at 0.5% offset (2) | 10 | 11 | 11 |
| Izod Impact (Notch) (2) ft-lb/in | 1.0 | 0.7 | 0.8 |
| Oxygen Index (3) | 21.7 | 25.2 | 29.4 |

(1) ASTM D-638
(2) ASTM D-256
(3) ASTM D-2863
(a) Control required at 10° C. higher molding temperature and 20% greater injection pressure than examples 3 and 4

EXAMPLE 5

Into a reactor was placed 24 kg of F-2001P (Makhteshim brand of tetrabromobisphenol-A bis glycidiyl ether) having an epoxy equivalent of 550, which was melted at 120° C. To this melt was added 11.656 kg tetrabromobisphenol-A; and these materials were blended at 120° C. until a clear, homogeneous mixture was formed. To this was added 18 g of tetrabutyl phosphonium bromide catalyst and the homogeneous mixture was blended for an additional ten minutes. The resulting melt was transferred to stainless steel reaction trays and placed into an oven at 180° C. for 4 hours. The glassy solid product (hereinafter referred to as F-2400H) was removed from the oven and chopped into small particles of about 0.5 cm$^3$. The intrinsic velocity of this product was 0.21 dl/g in dioxane at 30° C., which corresponds to a molecular weight of about 28,000.

EXAMPLE 6

A mixture of 3.75 kg Zytel-101 (a DuPont brand of Nylon 66), 937 g of the high molecular weight tetrabromobisphenol-A epoxy resin of Example 5, 310 g powdered antimony oxide, and 50 g calcium stearate were dry blended and fed into a Buss kneader at 270° C. The resulting master batch pellets were dry blended with pellets of Zytel-101 at a weight ratio of 4:1 and injection molded at 270° C., forming either a 3.2 mm thick specimen (as per ASTM D-638 Type a) or a specimen 3×12.7×127 mm. for physical testing. The results of these tests are shown in Table 2, all parts are by weight.

EXAMPLES 7-10

Following the method of Example 6, but using different ratios of Zytel-101, F-2400H, and antimony oxide, the dry blended materials were kneaded and injection molded at 270° C. However, after kneading, the material from Example 7 and 9 were directly injection molded. The results are shown in Table 2.

EXAMPLES 11-12

The method of Example 7 was applied to Akulon-M223D (an Akzo brand of Nylon 6) using a kneading and injection temperature of 230° C. The results are shown as follows in Table 3:

TABLE 3

| Material[a] | Control | Example 11 | Example 12 |
|---|---|---|---|
| Nylon 6 | 100 | 85 | 80 |
| F2400H | — | 15 | 15 |
| Antimony trioxide | — | — | 5 |
| Tensile Strength[b] | 800 | 697 | 751 |
| Tensile Modulus[b] | 1.3 | 1.3 | 1.4 |
| Elongation[b] | 7.2 | 6.8 | 6.6 |
| Oxygen Index[b] | 23.9 | 21.7 | 27.6 |

[a] All parts by weight
[b] Methods as per Table 2.

EXAMPLES 13-14

The method of Example 7 was applied to GRILAMID (an Emser Werks brand of Nylon 11) using a kneading and injection temperature of 220° C. The results are shown as follows in Table 4:

TABLE 4

| Material[a] | Control | Example 13 | Example 14 |
|---|---|---|---|
| Nylon 11 | 100 | 85 | 80 |
| F2400H | — | 15 | 15 |
| Antimony oxide | — | — | 5 |
| Tensile Strength[b] | 762 | 748 | 746 |
| Tensile Modulus[b] | 1.0 | 1.0 | 1.0 |
| Elongation[b] | 11 | 10 | 10 |
| Oxygen Index[b] | 23.8 | 23.2 | 28.1 |

[a] All parts by weight
[b] Methods as per Table 2

We claim:

1. A method for preparing a flame retardant thermoplastic nylon compositions comprising incorporating into the thermoplastic nylon a halogenated bisphenol-A epoxy resin having a halogen content of at least 20% and a molecular weight above 8,000 in an amount sufficient to impart flame retardance.

2. A method in accordance with claim 1, wherein the halogenated bisphenol-A epoxy resin is a brominated bisphenol-A epoxy resin comprising between 5 to 25 percent of the composition.

TABLE 2

| Example | Nylon 66[a] | F2400H[a] | Sb$_2$O$_3$[a] | Tensile Strength[c] at Yield (Kg f/cm$^2$) | Tensile Modulus[c] × 10$^4$ (kg f/cm$^2$) | Elongation[d] at Yield (%) | Oxygen Index[e] |
|---|---|---|---|---|---|---|---|
| — | 100 | — | — | 756 | 1.3 | 7.4 | 25 |
| 6[b] | 80 | 15 | 5 | 752 | 1.3 | 7.5 | 32.6 |
| 7 | 80 | 15 | 5 | 804 | 1.3 | 7.9 | 33.7 |
| 8[b] | 85 | 11.25 | 3.75 | 758 | 1.3 | 7.4 | 30.1 |
| 9 | 80 | 12.3 | 6.7 | 772 | 1.4 | 7.3 | 36.0 |
| 10[b] | 85 | 10 | 5 | 804 | 1.4 | 7.5 | 30.6 |

[a] All parts are by weight
[b] Master batch. Blended with additional nylon before injection molding.
[c] ASTM D-638
[d] ASTM D-256
[e] ASTM D-2863

3. A method in accordance with claims 1 or 2 wherein antimony trioxide is also incorporated in a weight ratio of halogenated bisphenol-A epoxy resin to antimony trioxide in the range of 0.25 to 6.

4. A thermoplastic nylon resin composition comprising a thermoplastic nylon resin and from 3 to 40 parts by weight of a halogenated bisphenol-A epoxy resin having a halogen content of at least 20% and a molecular weight greater than 8,000.

5. A composition in accordance with claim 4, wherein the epoxy resin is a brominated bisphenol-A epoxy resin.

6. A composition in accordance with claim 4 or 5 comprising also antimony trioxide in a weight ratio of brominated bisphenol-A epoxy resin to antimony trioxide in the range of 0.25 to 6.

7. A composition in accordance with claim 6 in which the molecular weight is at least 12,000.

8. A composition in accordance with claim 7 in which the molecular weight of the resin is about 15,000 to 28,000.

9. A method in accordance with claim 3 in which the molecular weight is at least 12,000.

10. A method in accordance with claim 9 in which the molecular weight of the resin is about 15,000 to 28,000.

* * * * *